United States Patent [19]

Iwase

[11] Patent Number: 5,115,354

[45] Date of Patent: May 19, 1992

[54] HIGH ACCURACY TRAVELING TABLE APPARATUS

[75] Inventors: Akira Iwase, Gotenba, Japan

[73] Assignee: Toshiba Machine Co., Ltd., Tokyo, Japan

[21] Appl. No.: 700,952

[22] Filed: May 14, 1991

Related U.S. Application Data

[60] Division of Ser. No. 539,615, Jun. 18, 1990, abandoned, which is a division of Ser. No. 368,150, Jun. 15, 1989, Pat. No. 4,953,965, which is a continuation of Ser. No. 201,283, May 27, 1988, abandoned, which is a continuation of Ser. No. 945,855, Dec. 23, 1986, abandoned.

[30] Foreign Application Priority Data

Aug. 25, 1986 [JP] Japan ................................ 61-129079

[51] Int. Cl.$^5$ ............................ G02B 7/18; A47B 7/00
[52] U.S. Cl. .................................. 359/873; 359/848; 269/73; 269/285; 108/143
[58] Field of Search ............... 350/632, 631, 609, 607, 350/321, 531; 269/73, 285; 108/143, 20; 248/476; 250/440.1, 442.1, 491.1; 384/18, 37; 356/357, 358

[56] References Cited

U.S. PATENT DOCUMENTS

| | | | |
|---|---|---|---|
| 4,420,223 | 12/1983 | Watanabe et al. | 350/631 |
| 4,421,386 | 12/1983 | Podgorski | 350/609 |
| 4,492,356 | 1/1985 | Taniguchi et al. | 269/73 |

FOREIGN PATENT DOCUMENTS

82212  5/1985  Japan .................................. 350/609

OTHER PUBLICATIONS

J. G. Bednorz et al., "Piezoelectric XY Translator", IBM Tech, Dis. Bull., vol. 26, No. 10A, pp. 4898–4899, Mar. 1984.

J. Aronstein et al., "Frictionless X, Y, Z . . . Table", IBM Tech. Dis. Bull., vol. 15, No.1 2, pp. 3899–3890, May 1973.

C. V. Rabstejnek, "Stepund Repeat . . . Table", IBM Tech. Dis. Bull., vol. 12, No. 11, pp. 1958–1959, Apr. 1970.

*Primary Examiner*—Jon W. Henry
*Attorney, Agent, or Firm*—Oblon, Spivak, McClelland, Maier & Neustadt

[57] ABSTRACT

A high-accuracy traveling table apparatus comprises a workpiece fixing device and a laser mirror for position measurement provided on a table capable of traveling at least in the direction of one axis. The table comprises a mount to which the workpiece fixing device and the laser mirror are fixed and at least one partially coupling member for partially coupling the mount to the table so as to prevent transmission of a distortion of the table to the mount.

4 Claims, 14 Drawing Sheets

HIGH ACCURACY TRAVELING TABLE APPARATUS

This application is a division of application Ser. No. 07/539,615, filed on June 18, 1990, now abandoned, which is a division of application Ser. No. 07/368,150, filed June 15, 1989, now U.S. Pat. No. 4,953,965, which is a continuation of abandoned application Ser. No. 07/201,283, filed May 27, 1988, which is a continuation of abandoned parent application Ser. No. 06/945,855, filed Dec. 23, 1986.

CROSS-REFERENCE TO RELATED APPLICATION

This application is related to commonly assigned co-pending application Ser. No. 539,614, filed concurrently herewith.

The present invention relates to high-accuracy traveling table apparatuses for carrying workpieces to be handled, which are adapted for use in, for example, electron-beam printing apparatuses, recycling defective inspection apparatuses, steppers, precision measuring apparatuses, etc.

BACKGROUND OF THE INVENTION

In conventional high-accuracy traveling table apparatuses of this type, a workpiece is placed fixedly on a table which travels in the directions of the X-, Y-, Z-, and $\theta$-axes (or sometimes only in the directions of the X- and Y-axes), in order to locate the workpiece accurately. In a traveling table section for locating the workpiece with respect to the X- and Y-directions, as shown in FIGS. 1 and 2, an X-table 14 is provided on a base 10. It can reciprocate linearly along guide ways 12, in the X-direction. A Y-table 18, which is disposed on the X-table 14, can reciprocate along guide ways 16, in the Y-direction, perpendicular to the X-direction. A workpiece fixing member 20, such as a holder, is disposed on the upper surface of Y-table 18. After a workpiece W is fixed to the fixing member 20, the tables 14 and 18 are caused to travel along the guide ways 12 and 16, in their respective predetermined directions, by drive means (not shown). Thus, the workpiece W on member 20 can be moved in both the directions of the X- and Y-axes.

An L-shaped laser mirror 22 for X/Y-direction position measurement is mounted on the upper surface of the Y-table 18. Moved distances in the X- and Y-directions are calculated in accordance with the variation of the laser value between the mirror 22 and a laser interferometer (not shown), which is fixed to a baseplate. The X- and Y-tables 14 and 18 are controlled so that the workpiece W is located accurately in accordance with a position measurement, based on the calculated values.

In the prior art apparatuses described above, the workpiece fixing member 20 and the laser mirror 22 for position measurement are mounted directly on the upper surface of the Y-table 18. Thus, regarding the distance between the member 20 and the mirror 22 as invariable, the position of the table 18 is measured by calculating its moved distance, in accordance with the variation of the aforesaid laser value. However, if X- and Y-tables 14 and 18 are deformed elastically or distorted by a temperature rise on the guide-way side when the tables 14 and 18 ar moved, the aforesaid distance varies, so that the measured value is subject to errors, correspondingly. This lowers the accuracy of the table-position measurement.

More specifically, in moving the workpiece fixing member 20 in the directions of the X- and Y-axes, fluctuations of pre-load may be caused by variations of the manufacturing accuracy of the guide ways 12 and 16 or of mounting surfaces of the tables 14 and 18 for the guide ways, change of weight balance attributable to the movement of the tables, etc. As a result, a tensile or compressive force is applied to the upper surface of the Y-table 18 on which the fixing member 20 and the laser mirror 22 are mounted, so that the mounting surface is extended or contracted. Thus, the distance between the member 20 and the mirror 22 varies, thereby causing errors in the position measurement. In the electron-beam printing apparatuses, in particular, the Y-table 18 is usually formed at a nonmagnetic material, such as aluminum, titanium, or beryllium bronze. Since, in particular, aluminum has low rigidity, the Y-table 18 is liable to be deformed while it is traveling. If the variation of the aforesaid distance, caused by the extension or contraction of the surface of the Y-table 18, is about 0.05 $\mu$m, it is not insignificant for the high-accuracy traveling table apparatuses of this type, whose positional accuracy at 3 $\sigma$ is expected to be 0.1 $\mu$m or less.

FIG. 3 shows the deformation of Y-table 18 while it is traveling. The degree of extension or contraction of the upper surface of Y-table 18, caused by such deformation, can be given by $$E = 4t\delta/l, \tag{1}$$

where E is the maximum degree of extension or contraction of the surface of the Y-table 18, t is the table thickness, l is the table length, and $\delta$ is the maximum distortion of the table surface, with respect to the vertical direction or Z-direction. If t=30 mm, l=250 mm, and $\delta$=0.2 $\mu$m, then E=4t$\delta$/l=0.1 $\mu$m. Thus, the surface of the Y-table 18 is extended by 0.1 $\mu$m at the maximum. If the phase of the distortion is inverted vertically, then the table surface is contracted by 0.1 $\mu$m. Such extension or contraction of the surface of the Y-table 18 directly influences the variation of the distance between the object fixing member 20 and the laser mirror 22.

If the surface of the Y-table 18, carrying the laser mirror 22, is extended or contracted, the flatness of the mirror 22, which usually ranges from about $\lambda$/20 to $\lambda$/10 ($\lambda$ is a wavelength of the laser beam; $\lambda \approx 0.6$ $\mu$m for Ne-He laser), is undesirably deformed. Thus, the measurement of the moved position is subject to errors, so that the accuracy of the apparatus is lowered.

In a conventional arrangement, the slit 24 is tentatively formed in a part of the Y-table 18 so that its opposite side edges are located above and below, as shown in FIG. 1. The slit 24 serves to absorb the working errors of guide ways 16 and X- and Y-tables 14 and 18. This arrangement is based on the so-called pre-load system, utilizing elasticity. In this case, however, the region around the slit 24 is low in rigidity, and it is susceptible to vibration.

OBJECT OF THE INVENTION

The object of the present invention is to provide a high-accuracy traveling table apparatus, which can avoid the aforementioned problems of the prior art apparatuses and in which variations of the distance between an object fixing member and a laser mirror for position measurement, arranged on a table, can be reduced considerably so as to enable an accurate position measurement, even though the table is deformed as it travels.

SUMMARY OF THE INVENTION

In order to achieve the above object of the present invention, a high-accuracy traveling table apparatus comprises a workpiece fixing means and a laser mirror for position measurement provided on a table capable of traveling at least in the direction of one axis. The table comprises a mount to which the workpiece fixing means and the laser mirror are fixed and at least one partially coupling means to partially couple the mount to the table so as to avoid transmission of a distortion of the table to the mount.

BRIEF DESCRIPTION OF THE DRAWINGS p

Various preferred embodiments and modifications of the present invention will now be described with reference to the accompany drawings.

DETAILED DESCRIPTION OF THE PREFERRED EMBODIMENTS

The First Embodiment

Figure 1:
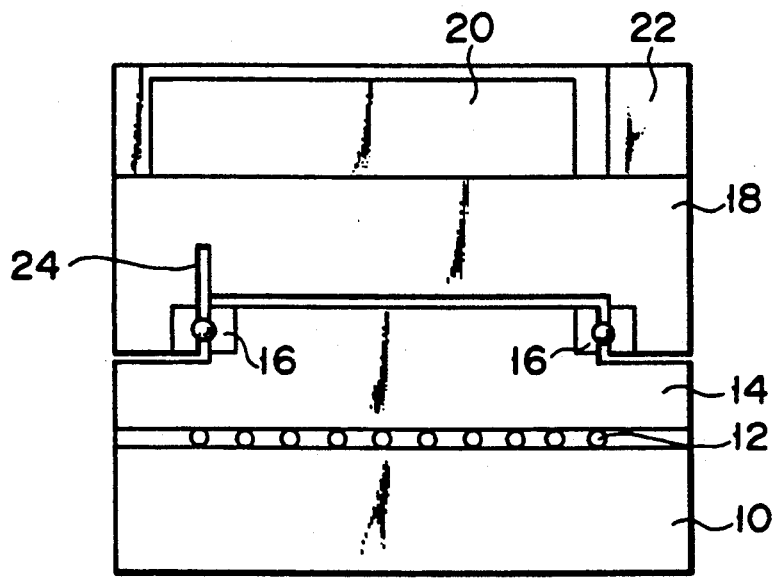
FIG. 1 is a front view schematically showing a prior high-accuracy traveling table apparatus.
Figure 2:
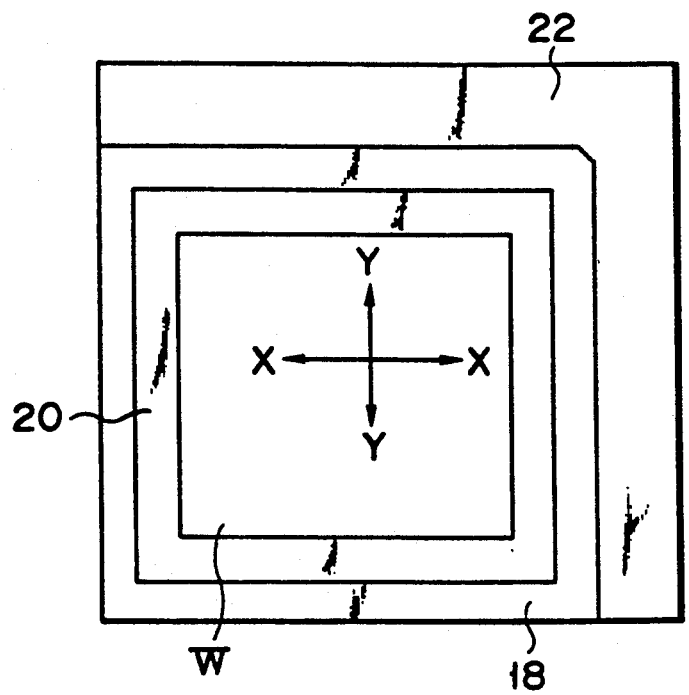
FIG. 2 is a schematic plan view of the prior high-accuracy traveling table apparatus of FIG. 1.
Figure 4:
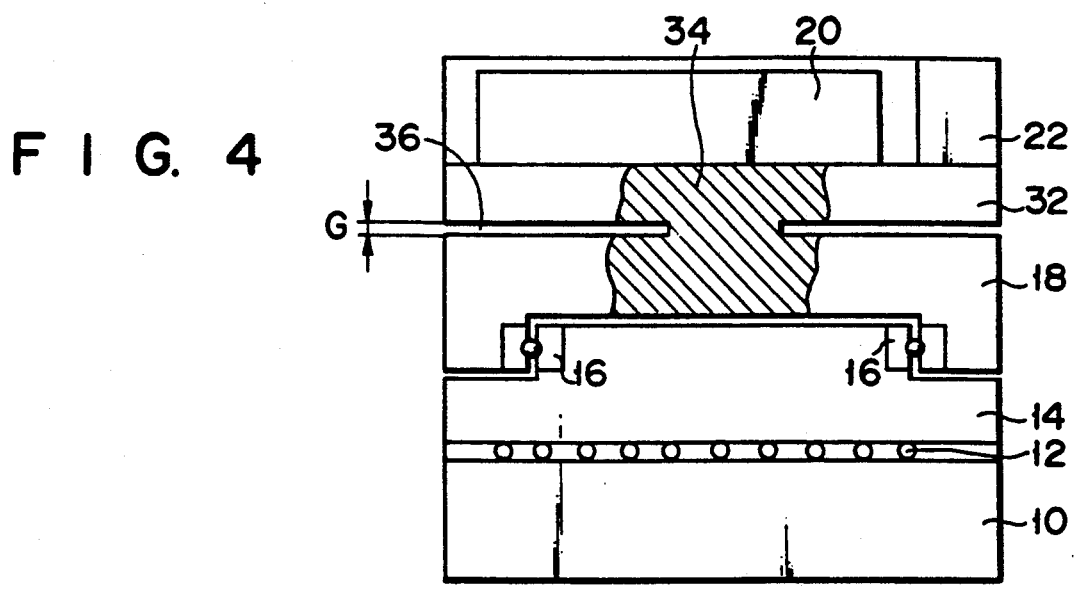
FIG. 4 is a partial front view schematically showing a high-accuracy traveling table apparatus according to a first embodiment of this invention.
Figure 5:
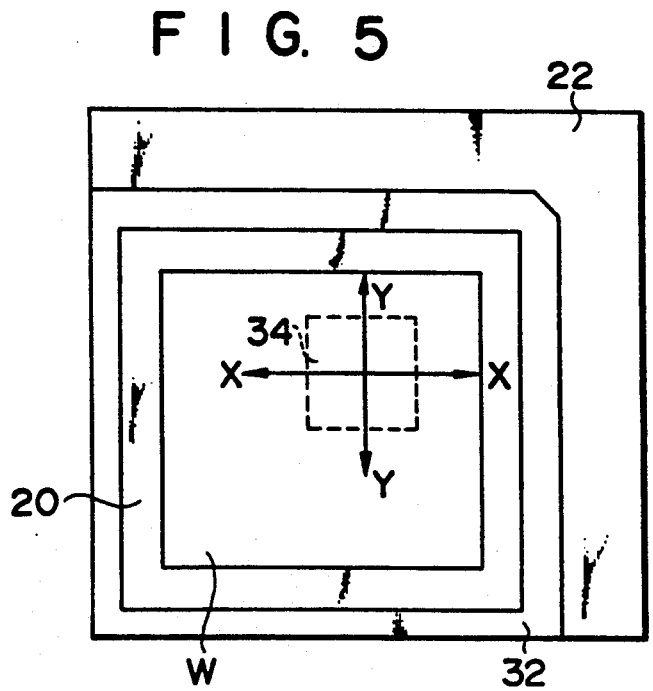
FIG. 5 is a schematic plan view of the high-accuracy traveling table apparatus of FIG. 4.

Referring not to FIGS. 4 and 5, a first embodiment of the present invention will be described. In the description to follow, like reference numerals are used to designate like members as described in connection with FIGS. 1 and 2, and a detailed description of those members is omitted. In FIG. 4, reference numeral 18 denotes a Y-table which is disposed on an X-table 14 so as to be able to reciprocate along guide ways 16 in the direction of the Y-axis. The central portion (partial coupling portion 34) of the lower surface of a mount 32 is coupled integrally to the upper surface of the table 18. The Y-table 18 is substantially as thick as a conventional one, and the mount 32 is a plate which is a little thinner than the table 18. A gap 16 is formed by cutting or the like, covering all the region between the upper surface of the Y-table 18 and the lower surface of the mount 32 except the coupling portion 34. The gap 36 has width G such that the upper surface of the Y-table 18 is not in contact with the lower surface of the mount 32 when the table 18 is deformed. The workpiece fixing member 20 and the laser mirror 22 for position measurement are fixed on the upper surface of the mount 32.

In moving the workpiece fixing member 20 in the directions of the X- and Y-axes, fluctuations of pre-load may be caused by variations of the manufacturing accuracy of the guide ways 12 and 16 or of mounting surfaces of the tables 14 and 18 for the guide ways, change of weight balance attributable to the movement of the tables, and frictional heat generated in the ways 12 and 16. According to the aforesaid arrangement, however, if the Y-table 18 is distorted or deformed as a result of the pre-load fluctuations, such deformation cannot be transmitted directly to the mount 32, which is coupled to the table 18 only by means of the partial coupling portion 34, with a narrow sectional area. In other words, the deformation of the table 18 can influence the mount 32 only through the coupling portion 34. Accordingly, the mount 32 can not easily be deformed, so that the distance between the fixing member 20 and the mirror 22, on the upper surface of the mount 32, is subject to no substantial variation. Thus, the measured position, after movement in the directions of the X- and Y-axes, cannot involve errors, so that the apparatus can enjoy improved accuracy.

Even if the Y-table 18 is deformed, moreover, that surface of the mount 32 bearing the laser mirror 22 cannot be deformed. Thus, the accuracy of the position measurement cannot be lowered due to a deformation in flatness of the mirror 22.

Figure 6:
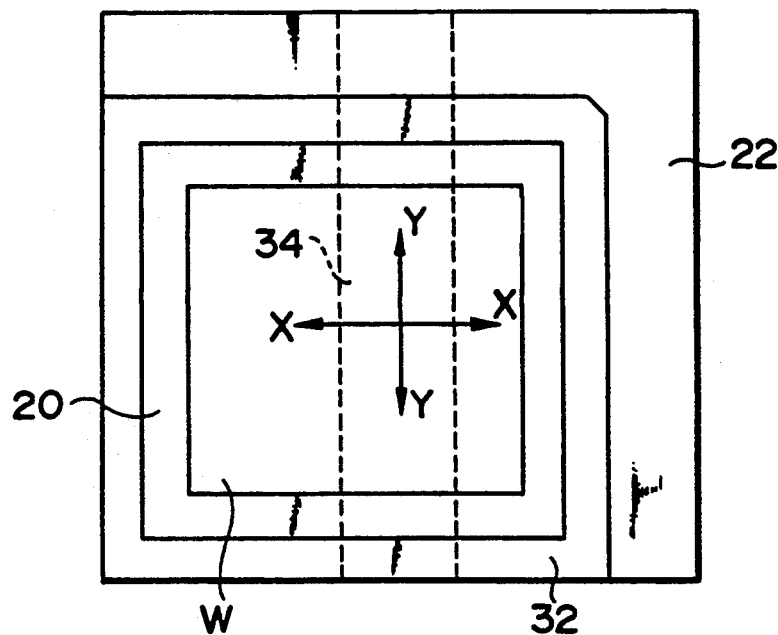
FIG. 6 is a plan view schematically showing a first modification of the high-accuracy traveling table apparatus of FIG. 4.

In this embodiment, the cross section of the partial coupling portion 34 between the Y-table 18 and the mount 32 may be circular, elliptic, triangular, or polygonal. Alternatively, the portion 34 may be elongated in the traveling direction (Y-direction) of the Y-table 18, as shown in FIG. 6.

Figure 7:
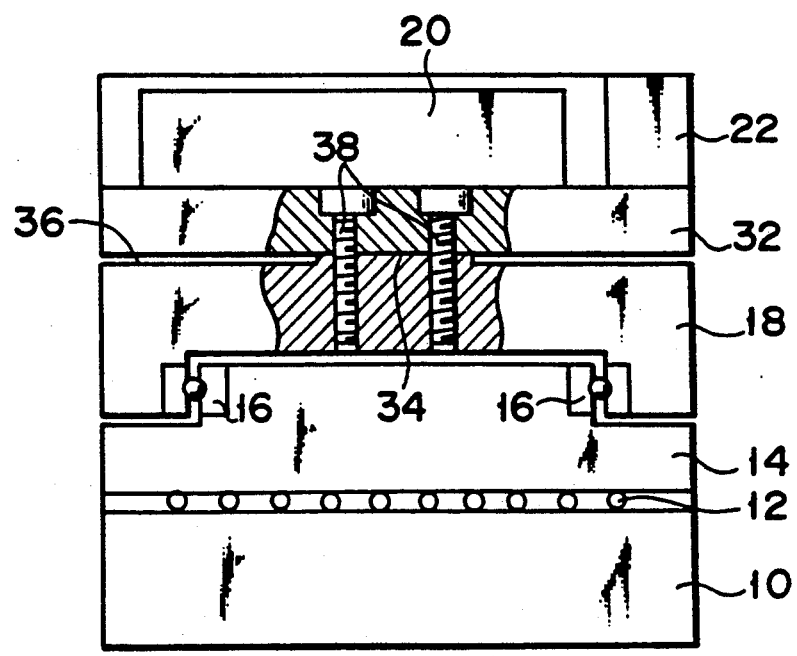
FIG. 7 is a partial front view schematically showing a second modification of the high-accuracy traveling table apparatus of FIG. 4.

As shown in FIG. 7, moreover, the Y-table 18 and the mount 32 may be formed independently of each other. In this case, a projection, which serves as partial coupling portion 34, is formed on at least either the upper surface of the Y-table 18 or the lower surface of the mount 32 at its center. Y-table 18 and the mount 32 are coupled together by means of several bolts 38 or other fixing means.

The mount 32 may be formed of Invar, Super-invar, low-expansion glass, silica glass, or other materials whose coefficient of thermal expansion is lower than those of aluminum, titanium and beryllium bronze, which are the conventional material of the Y-table 18. In this case, the influences of thermal deformation can be reduced. The mount 32 can enjoy higher accuracy if it is formed of a material of higher rigidity, such as steel and fine-ceramics. If the mount 32 is formed of a magnetic material in an electron-beam printing apparatus, however, it naturally requires magnet-ic shielding means.

The Second Embodiment

Figure 3:
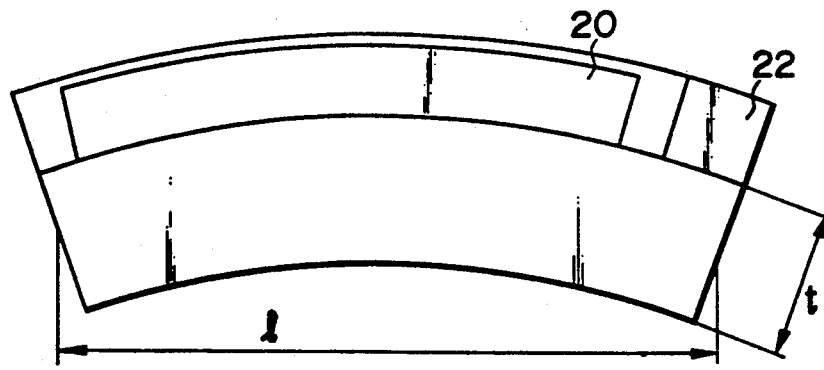
FIG. 3 is a front view schematically showing deformation of a workpiece fixing means and a laser mirror caused by distortion of Y-table in the prior high-accuracy traveling table apparatus of FIG. 1.
Figure 8:
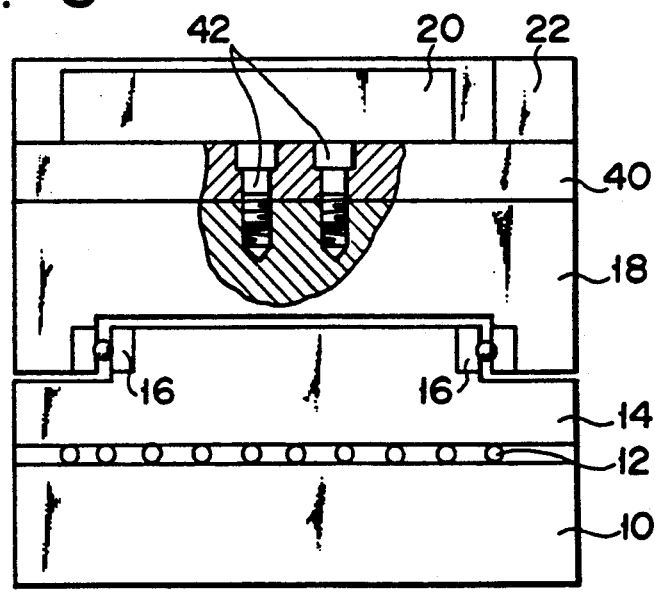
FIG. 8 is a partial front view schematically showing a high-accuracy traveling table apparatus according to a second embodiment of this invention.
Figure 9:
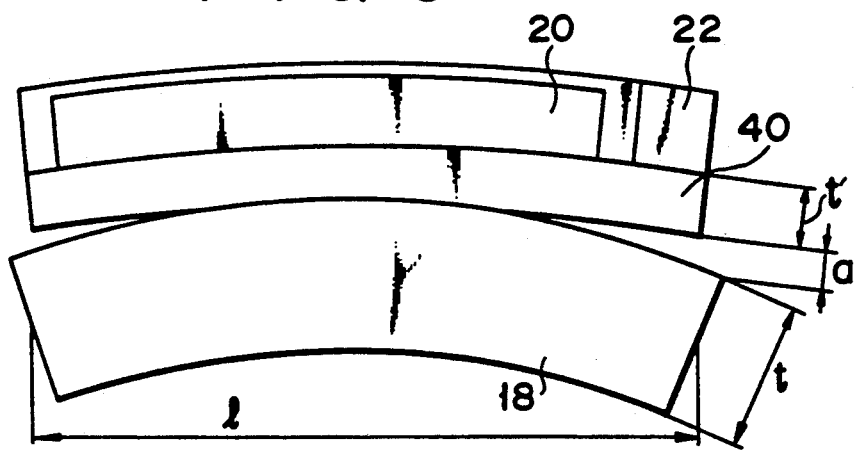
FIG. 9 is a front view schematically showing deformation of the workpiece fixing means and a laser mirror caused by upward distortion of the Y-table in the high-accuracy traveling table apparatus of FIG. 8.
Figure 10:
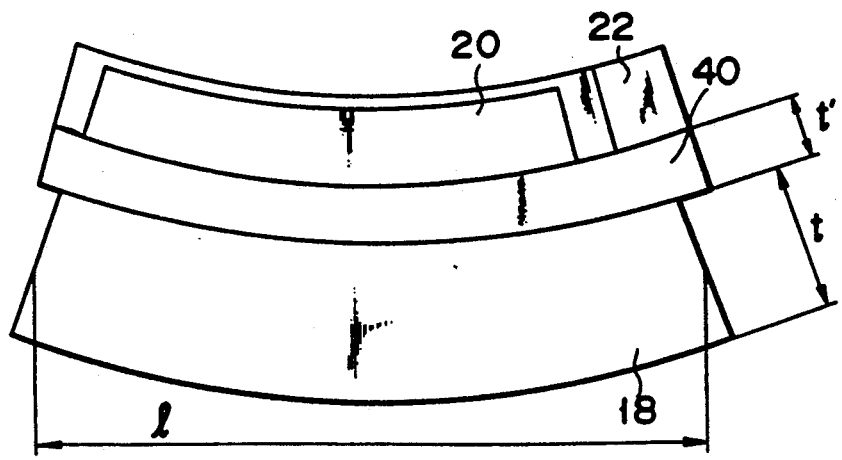
FIG. 10 is a front view schematically showing deformation of the workpiece fixing means and the laser mirror caused by downward distortion of the Y-table in the high-accuracy traveling table apparatus of FIG. 8.

Referring now to FIGS. 8, 9 and 10, a second embodiment of the present invention will be described. In the description to follow, like reference numerals are used to designate like members as described in connection with FIGS. 1 to 3, and a detailed description of those members is omitted. In FIGS. 8 to 10, reference numeral 40 denotes a mount which is formed independently of the Y-table 18. As in the case of the prior art apparatus, the Y-table 18 is arranged so as to be able to reciprocate along the guide ways 16 in the direction of the Y-axis. The mount 40 is as thin as about one-third the thickness of the Y-table 18. In this embodiment, the Y-table 18 has thickness t of about 30 mm, and the mount 40 has thickness t' of about 10 mm. The mount 40 is partially coupled to the Y-table 18, only at its central portion, by means of a plurality of bolts 42 or other fixing means. The workpiece fixing member 20 and the laser mirror 22, for position measurement, are fixed on the upper surface of the mount 40.

In moving the workpiece fixing member 20 in the directions of the X- and Y-axes, fluctuations of pre-load may be caused by variations of the manufacturing accuracy of the guide ways 12 and 16 or of mounting surfaces of the tables 14 and 18 for the guide ways, change of weight balance attributable to the movement of the tables, and frictional heat generated in the ways 12 and 16. According to the arrangement of this embodiment, however, if the Y-table 18 is deformed to a maximum distortion of about 0.02 $\mu$m with respect to the Z-direction, as a result of the pre-load fluctuations, the surface of the table 18 is subject to extension or contraction of about $\pm 0.1$ $\mu$m, as is obtained from eq. (1).

However, the mount 40, which is a thin plate only partially coupled to Y-table 18 at its central portion, can only be negligibly deformed. If the Y-table 18 is deformed in the manner shown in FIG. 9, for example, its deformation cannot influence the mount 40 directly. Thus, the mount 40 is kept straight without any substantial deformation, only leaving gap a between its lower surface and the upper surface of the Y-table 18. Accordingly, the surface of the mount 40 is subject to very little extension or contraction, so that the variation of the distance between the workpiece fixing member 20 and the laser mirror 22, on the surface of the mount, is substantially zero.

If the phase of the deformation of the Y-table 18 is inverted, as shown in FIG. 10, the central portion of the mount 40 is drawn downward, while both side portions thereof are forced up, thus producing distortion of about 0.2 $\mu$m at the maximum. However, the mount 40 has thickness t' of 10 mm, which is thinner than the thickness of Y-table 18. Therefore, if the length l and maximum Z-direction distortion $\delta$ are about 250 mm and 0.2 $\mu$m, respectively, the maximum surface contraction E, calculated according to eq. (1), is $E = 4t'\delta/l = 0.03$ $\mu$m. In other words, even though the surface of the Y-table 18 contracts by a maximum of 0.1 $\mu$m, the surface of the mount 40 contracts only by 0.03 $\mu$m, at the maximum. Accordingly, the deformation of the Y-table 18 never directly influences the variation of the distance between the workpiece fixing member 20 and the laser mirror 22, both of which are fixed, on the upper surface of the mount 40. As a result, the distance between the member 20 and the mirror 22 does not substantially vary, so that the measured positions, with respect to the X- and Y-directions, are subject to no errors. Thus, positioning can be effected accurately.

Figure 11:
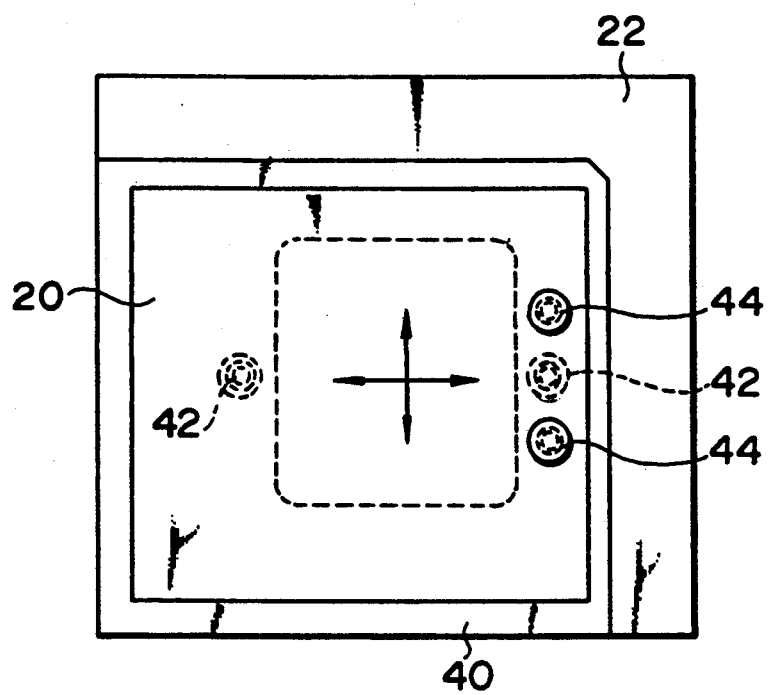
FIG. 11 is a schematic front view of a modification of the high-accuracy traveling table apparatus of FIG. 8.
Figure 12:
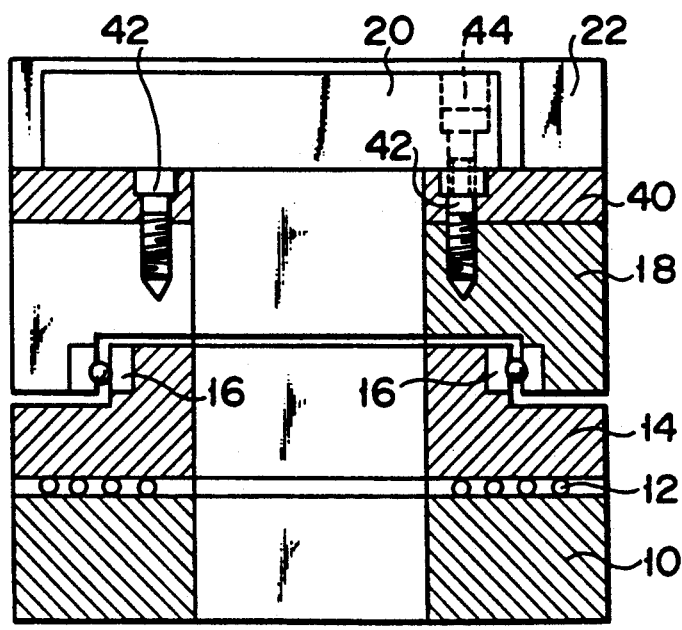
FIG. 12 is a schematic vertical sectional view of the high-accuracy traveling table apparatus of FIG. 11.

FIGS. 11 and 12 show a modification of the second embodiment. In this modification, coaxial apertures are bored through the respective central portions of the base 10, the X-table 14, the Y-table 18, and the mount 40. The mount 40 is coupled to the Y-table 18 by means of fixing means, such as bolts 42, at two opposite side portions of the peripheral edge of the aperture in the table 18, with respect to the X-direction. The workpiece fixing member 20 and the L-shaped laser mirror 22 for position measurement are mounted on the mount 40. The member 20 is fixed to the upper surface of the mount 40 by means of bolts 44, only at the mirror-side portion of the peripheral edge of the aperture in the mount 40, as viewed in the X-direction.

The modification of FIGS. 11 and 12 provides the same functions or technical advantages as aforesaid. More specifically, if the Y-table 18 is distorted so that it extends or contracts with respect to the Y-direction, the surface of the mount 40 does not substantially extend or contract, for the same reasons as aforesaid. Since the workpiece fixing member 20 is fixed to the mount 40 only at the position beside the laser mirror 22 with respect to the X-direction, the variation of the distance between the member 20 and the mirror 22 is less influenced by extension or contraction of the member 20 in the X-direction.

In the second embodiment and its modification described above, the mount 40 can enjoy higher accuracy if it is formed of a material whose rigidity is greater than that of aluminum, titanium, or beryllium bronze, the conventional materials used for the Y-table 18. Also, the influences of thermal deformation can be reduced if the mount 40 is formed of a material with a lower coefficient of thermal expansion. If the mount 40 is formed of a magnetic material, magnetic shielding means may be mounted, when necessary.

The Third Embodiment

Figure 13:
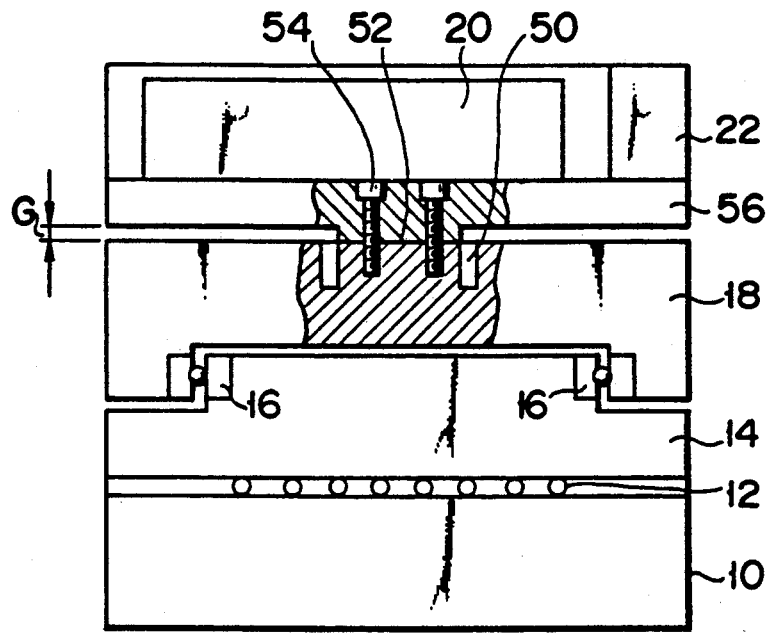
FIG. 13 is a schematic front view of a high-accuracy traveling table apparatus of a third embodiment of this invention.
Figure 14:
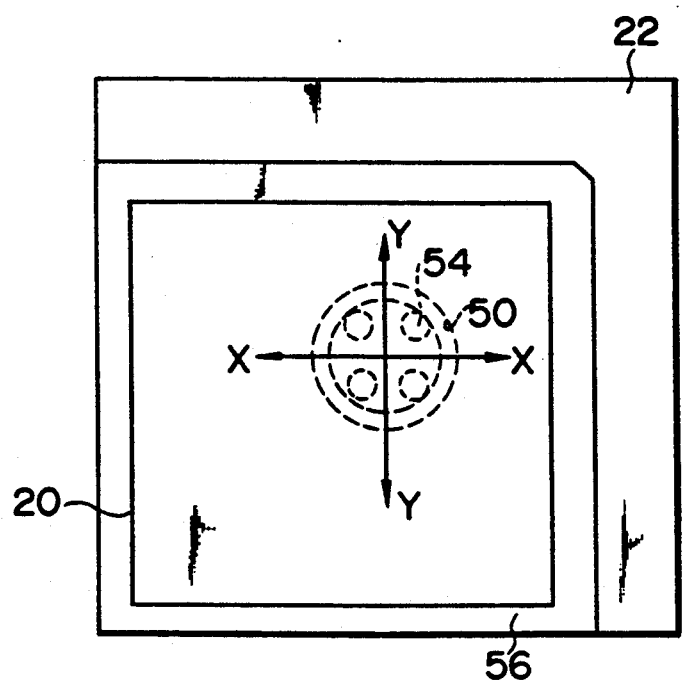
FIG. 14 is a schematic plan view of the high-accuracy traveling table apparatus of FIG. 13.

Referring now to FIGS. 13 and 14, a third embodiment of the present invention will be described. In the description to follow, like reference numerals are used to designate like members, as described in connection with FIGS. 1 and 2, and a detailed description of those members is omitted. A ring-shaped groove 50 is formed in the central portion of the upper surface of the Y-table 18. A mount 56 is fixed, by fixing means such as bolts 54, on an insular portion (partial coupling portion) 52, which is defined by the groove 50. The L-shaped laser mirror 22 and the workpiece fixing member 20 are located on the mount 56. The groove 50 serves to cut off the portion 52 from the influences of extension or contraction, if any, of the upper surface of the Y-table 18. A gap G between the upper surface of the Y-table 18 and the lower surface of the mount 56 has a width such that the table 18 and the mount 56 are not in contact with each other if the table 18 is deformed. The depth of the groove 50 is a little greater than the depth of the screw-engagement of the fixing means 54.

In moving workpiece fixing member 20 and the laser mirror 22 in the directions of the X- and Y-axes, fluctuations of pre-load may be caused by variations of the manufacturing accuracy of the guide ways 12 and 16 or of mounting surfaces of the tables 14 and 18 for the guide ways, change of weight balance attributable to the movement of the tables, and frictional heat generated in the ways 12 and 16. According to the arrangement of this embodiment, however, if the Y-table 18 is deformed to a maximum distortion of about 0.2 μm with respect to the Z-direction, as a result of the pre-load fluctuations, the surface of the table 18 is subject to extension or contraction of about ±0.1 μm, as is obtained from eq. (1).

Within an insular portion or partial coupling portion 52 of the Y-table 18, which is isolated from deformation of the surface of the table 18 by the groove 50, however, neither extension nor contraction can be caused. Thus, the laser mirror 22 and the fixing member 20, which are coupled to portion 52 by means of the mount 56, are not influenced by the distortion of the Y-table 18. Accordingly, the relative positions of the mirror 22 and member 20 cannot vary, and the flatness of the mirror 22 cannot be deformed. In consequence, the measured positions, with respect to the X- and Y-directions, are subject to no errors. Thus, positioning can be effected accurately.

The Fourth Embodiment

Figure 15:
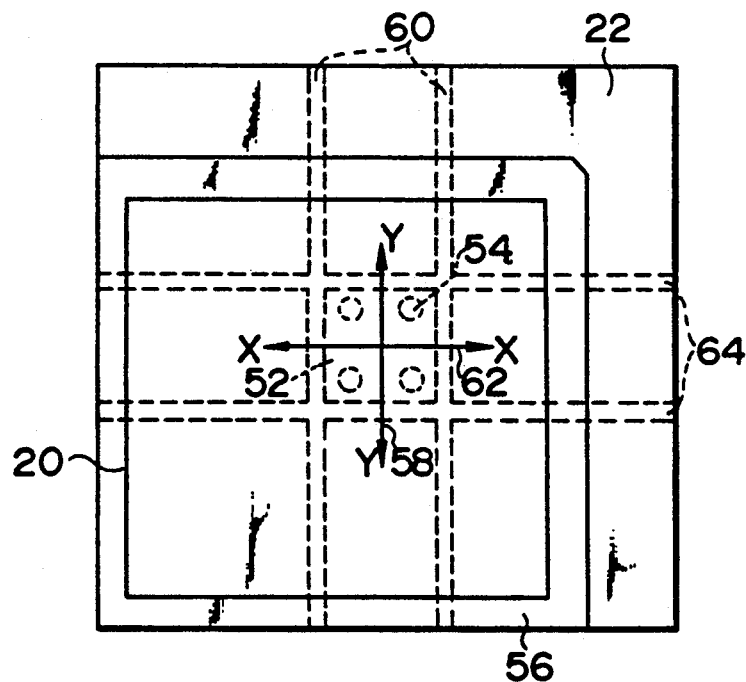
FIG. 15 is a schematic plan view of the high-accuracy traveling table apparatus according to a fourth embodiment of this invention.

Referring now to FIG. 15, a fourth embodiment of the present invention will be described. In this embodiment, the partial coupling portion 52 for the mount 56 has a square shaped horizontal section. The square insular portion 52 is surrounded by a couple of linear grooves 60 located on the opposite sides of the Y-direction center line 58 and another couple of linear grooves 64 located on the opposite sides of X-direction center line 62. Both linear grooves 60 and 64 are formed on the upper surface of the table 18. The mount 56, carrying the laser mirror 22 and the object fixing member 20, is fixed on portion 52 by fixing means, such as the bolts 54.

The Fifth Embodiment

Figure 16:
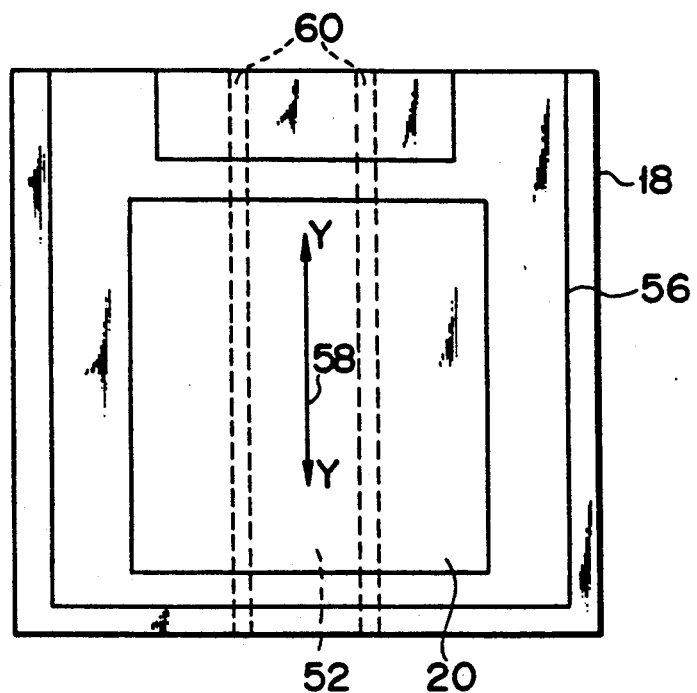
FIG. 16 is a schematic plan view of a high-accuracy traveling table apparatus according to a fifth embodiment of this invention.
Figure 17:
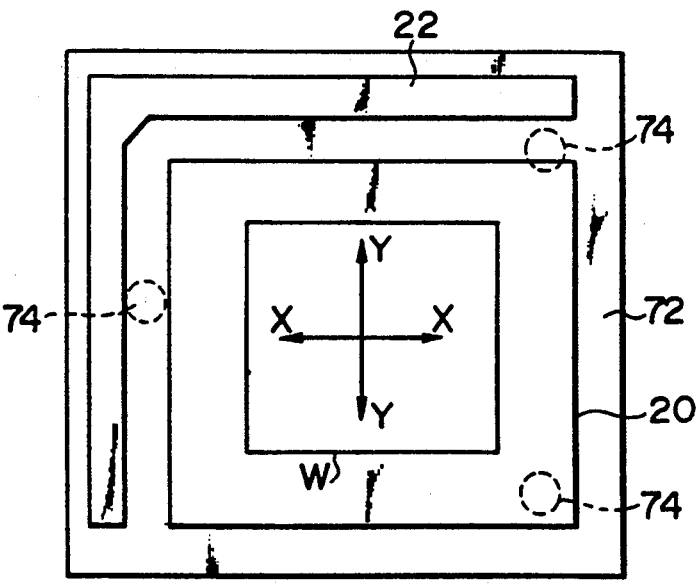
FIG. 17 is a schematic plan view of a high-accuracy traveling table apparatus according to a sixth embodiment of this invention.
Figure 18:
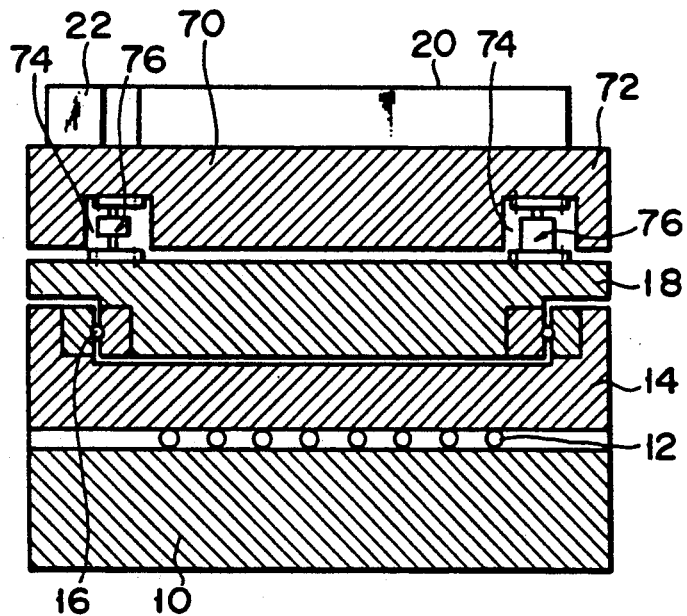
FIG. 18 is a schematic vertical sectional view of the high-accuracy traveling table apparatus of FIG. 17.

FIG. 16 shows a fifth embodiment of the present invention. In this embodiment, the X-table is omitted, and only the Y-table 18, movable only in the direction of the Y-axis, is used for the table means. In this case, the partial coupling portion 52 for the mount 58 has a rectangular shaped horizontal section. The rectangular insular portion 52 is defined by a couple of linear grooves 60, formed on the opposite sides of the Y-direction center line 58, on the upper surface of the table 18. The mount 56, carrying the laser mirror 22 and the workpiece fixing member 20, is fixed on the portion 52 by fixing means, such as the bolts 54.

The Sixth Embodiment

Referring now to FIGS. 17 to 20, a sixth embodiment of the present invention will be described in detail. In the description to follow, like reference numerals are used to designate like members as used in the prior art apparatus shown in FIGS. 1 to 3, and a detailed description of those members is omitted.

In a high-accuracy traveling table apparatus shown in FIGS. 17 to 20, a mount 72, disposed on the Y-table 18, has mounting surface 70 extending substantially parallel to the plane along which the table 18 travels.

Three depressions 74 are formed in the lower surface of a mount 72 which faces the Y-table 18. Flange head portions 78 of elastic members 76, fixed to three locations on the upper surface of the Y-table 18, are fitted individually in the depressions 74. Thereupon, mount 72 is supported on the Y-table 18 at the three locations, with respect to the direction of the Z-axis, which extends at a right angle to the plane along which the table 18 travels. The workpiece fixing member 20 and the laser mirror 22 for position measurement are located on the mounting surface 70 of the mount 72.

Figure 19:
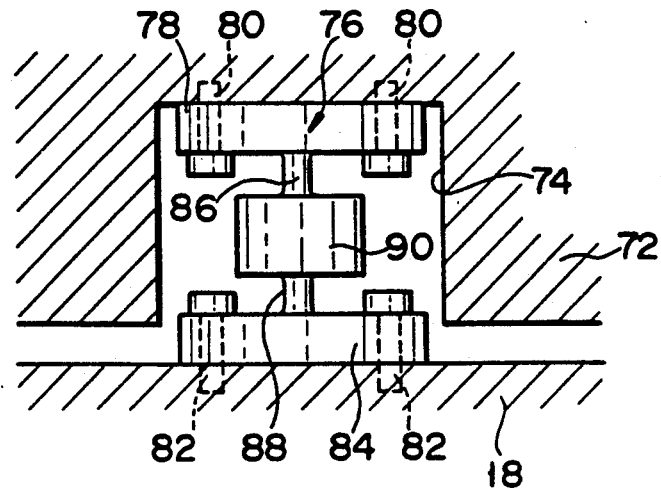
FIG. 19 is an enlarged front view schematically showing an elastic connecting member used in the high-accuracy traveling table apparatus.

As shown in detail in FIG. 19, each elastic member 76 includes a flange head portion 78 fixed to the bottom surface of the corresponding depression 74 of the mount 72 by means of bolts 80 and a flange leg portion 84 fixed to the upper surface of the Y-table 18 by means of the bolts 82. Each member 76 includes a pillar portion 90 which is coupled integrally to the portions 78 and 84 by means of pin-shaped waist portions 86 and 88 formed on the upper and lower surfaces of the pillar portion 90, respectively. Each of the waist portions 86 and 88 has a smaller diameter than that of the pillar portion 90 and is rotatable within a fine range around the longitudinal center line (Z-axis) of the corresponding pillar portion 90, and each of the waist positions 86 to 88 is movable parallel to the directions of the X- and Y-axes.

Figure 20:
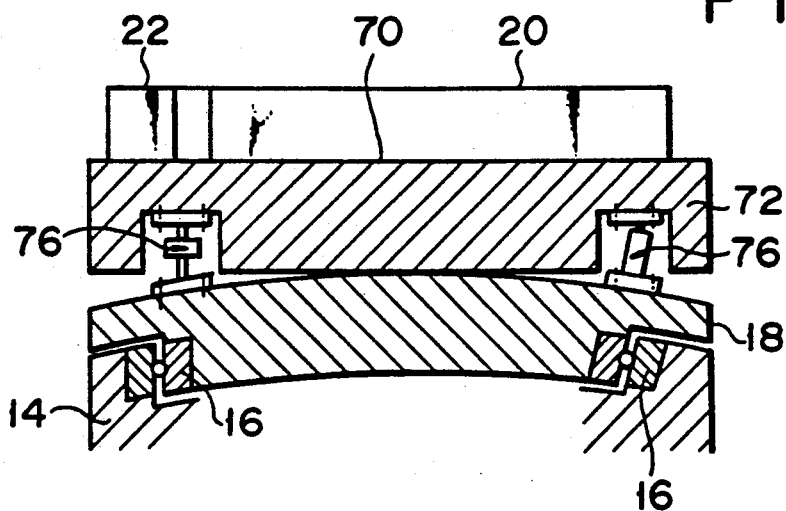
FIG. 20 is a sectional view schematically showing deformation of the elastic connecting member caused by distortion of a Y-table in the high-accuracy traveling table apparatus.
Figure 21:
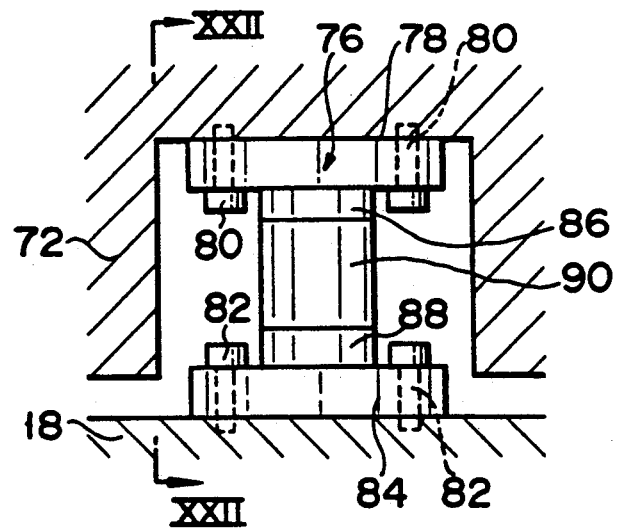
FIG. 21 is a front view schematically showing a first modification of the elastic connecting member used in the high-accuracy traveling table apparatus of FIG. 18.
Figure 22:
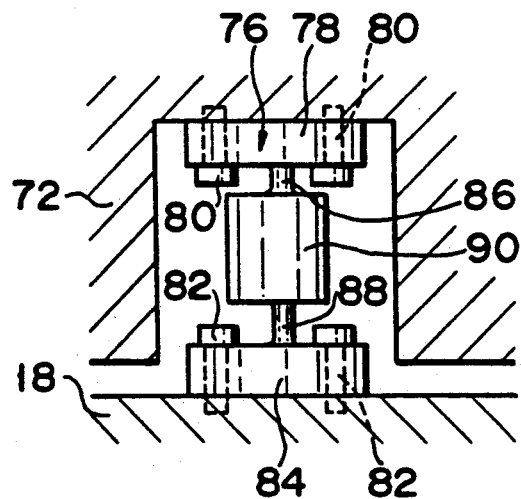
FIG. 22 is a front view schematically showing the first modification of the elastic connecting member showed in the direction of arrows XXII—XXII of FIG. 21.
Figure 23:
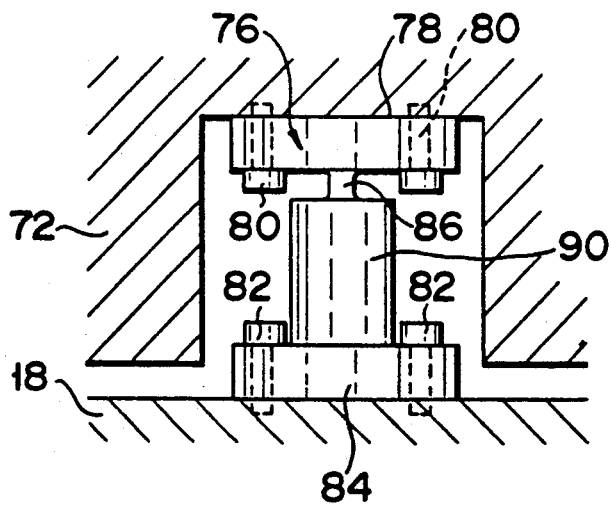
FIG. 23 is a front view schematically showing a second modification of the elastic connecting member used in the high-accuracy traveling table apparatus of FIG. 18.
Figure 24:
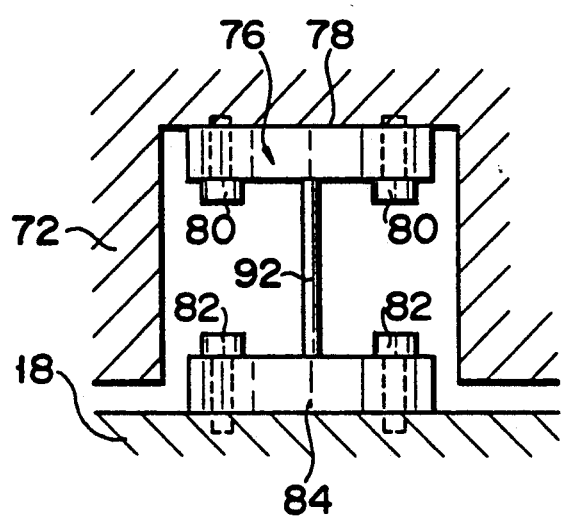
FIG. 24 is a front view schematically showing a third modification of the elastic connecting member used in the high-accuracy traveling table apparatus of FIG. 18.
Figure 25:
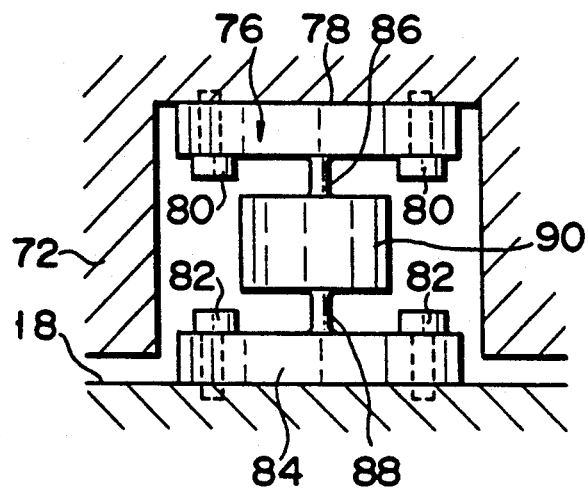
FIG. 25 is a front view schematically showing a fourth modification of the elastic connecting member used in the high-accuracy traveling table apparatus of FIG. 18.
Figure 26:
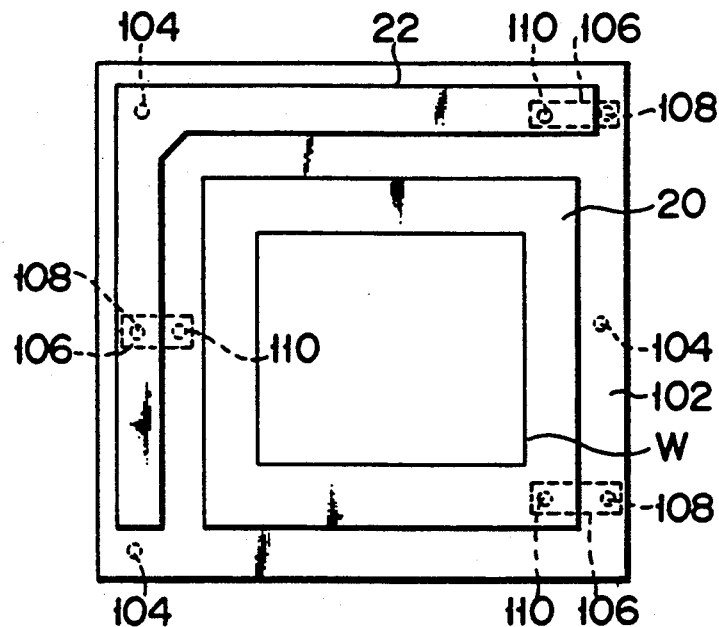
FIG. 26 is a schematic plan view of a high-accuracy traveling table apparatus according to a seventh embodiment of this invention.
Figure 27:
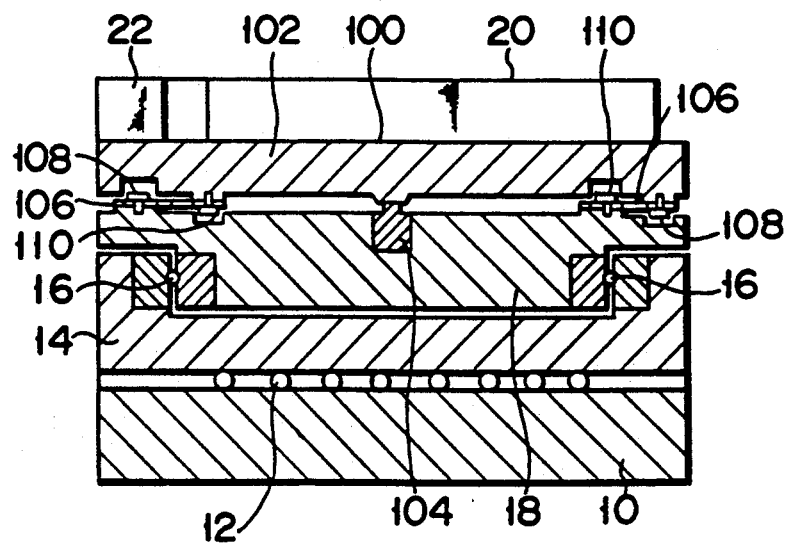
FIG. 27 is a sectional view schematically showing a vertical section of the high-accuracy traveling table apparatus of FIG. 26.
Figure 28:
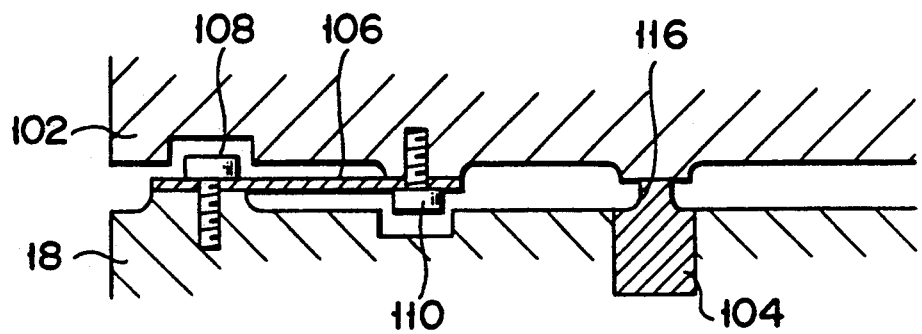
FIG. 28 is an enlarged view showing a neighborhood of a partial connecting means of the high-accuracy traveling table apparatus of FIG. 26.

Fluctuations of pre-load may be caused by variations of the manufacturing accuracy of the guide ways 12 and 16 or of mounting surfaces of the tables 14 and 18 for the guide ways, change of weight balance attributable to the movement of the tables, and frictional heat generated in the ways 12 and 16. According to the arrangement described above, if the Y-table 18 is distorted as shown in FIG. 20, as a result of the pre-load fluctuations, such deformation is absorbed by rotation and/or parallel movement of the waist portions 86 and 88 of the elastic members 76. Therefore, the deformation of the Y-table 18 cannot be transmitted to the mount 32 on table 18. Accordingly, the relative positions of the laser mirror 22 and the fixing member 20 cannot vary, thus permitting the apparatus to enjoy greatly improved accuracy. As the elastic members 76 are deformed, the mount 72 is inclined at a very narrow angle to a horizontal plane. However, the tilt of the mount 72 is about 0.1 to 0.3 μm per its overall length. Such an inclination cannot entail any errors in the system for position measurement.

FIGS. 21 to 25 show first to fourth modifications of the elastic member 76. In the first modification shown in FIGS. 21 and 22, the waist portions 86 and 88, formed on the upper and lower surfaces of the pillar portion 90, respectively, are each in the form of a thin flat plate. In the second modification shown in FIG. 23, the lower waist portion 88 is omitted so that the lower end of the pillar portion 90 is integrally formed with the flange leg portion 84. In the third embodiment shown in FIG. 24, the pillar portion 90 and both the waist portions 86 and 88 are omitted, and the flange head portion 78 and the flange leg portion 84 are connected by means of a member 92 in the form of a slender pin or thin flat plate. In the fourth embodiment shown in FIG. 25, the upper waist portion 86 is in the form of a slender pin, while the lower waist portion 88 is in the form of a thin flat plate. In the sixth embodiment, the aforesaid various modifications are preferably combined for use as the three elastic members. Thus, at least one of the members 76 is allowed only to rotate, while the other two elastic members are allowed to both rotate and move parallel to each other.

The Seventh Embodiment

Referring now to FIGS. 26 to 29, a seventh embodiment of the present invention will be described in detail. In the description to follow, like reference numerals are used to designate like members as used in the prior art apparatus shown in FIGS. 1 to 3, and a detailed description of those members is omitted.

In the seventh embodiment, the mount 102, located on the Y-table 18, has a mounting surface 100 extending substantially parallel to the plane along which the table 18 travels.

The mount 102 is supported on the Y-table 18 by supporting pins 104, embedded therein at three locations, with respect to the direction of the Z-axis which extends at a right angle to the plane along which the table 18 travels. The workpiece fixing member 20 and the laser mirror 22 for position measurement are disposed on the mounting surface 100 of the mount 102. Also, mount 102 is coupled to the Y-table 18 by means of elastic members 106 which are mounted on the table 18 at three locations. Each elastic member 106 is fixed to both the Y-table 18 and the mount 102 by fixing means, such as bolts 108 and 110. In this embodiment, the mount 102 has an elastic structure such that its rigidity is greater with respect to the X- and Y-directions, or the plane along which Y-table 18 travels, and is lower with respect to the vertical direction, perpendicular to the traveling directions or plane.

Figure 29:
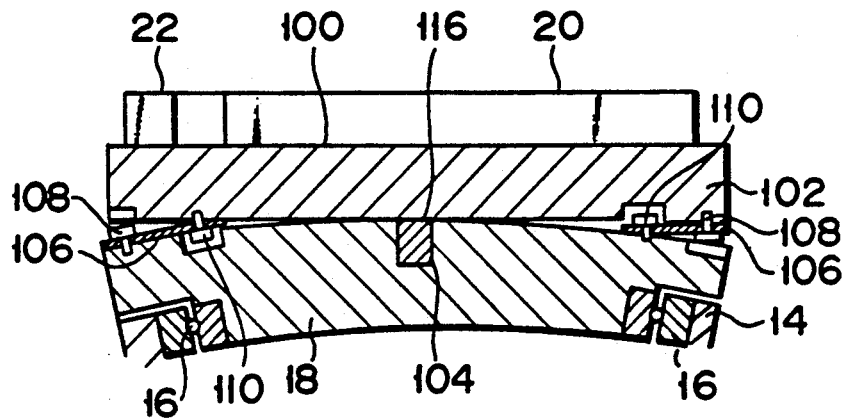
FIG. 29 is a vertical sectional view schematically showing deformation of the partial connecting means caused by distortion of a Y-table of the high-accuracy traveling table apparatus of FIG. 26.

Fluctuations of pre-load may be caused by variations of the manufacturing accuracy of the guide ways 12 and 16 or of mounting surfaces of the tables 14 and 18 for the guide ways, change of weight balance attributable to the movement of the tables, and frictional heat generated in the ways 12 and 16. According to the arrangement described above, if the Y-table 18 is distorted as shown in FIG. 29 or in the other direction, as a result of the pre-load fluctuations, such deformation is absorbed by the elastic members 106. Therefore, the deformation of the Y-table 18 cannot be transmitted to mount 102 on the table 18. Accordingly, the relative positions of the laser mirror 22 and the fixing member 20 cannot vary, thus permitting the apparatus to enjoy greatly improved accuracy.

Figure 30:
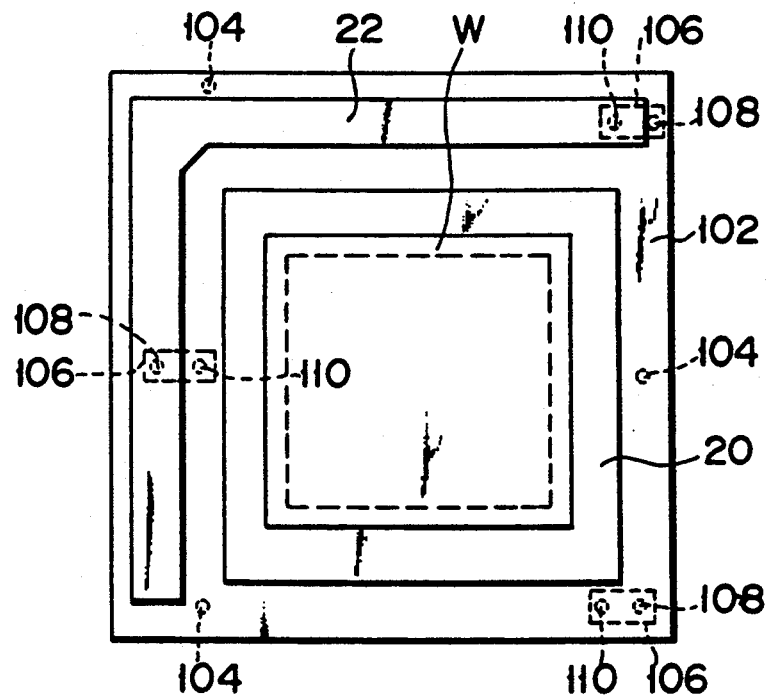
FIG. 30 is a plan view schematically showing a first modification of the high-accuracy traveling table apparatus of FIG. 26.
Figure 31:
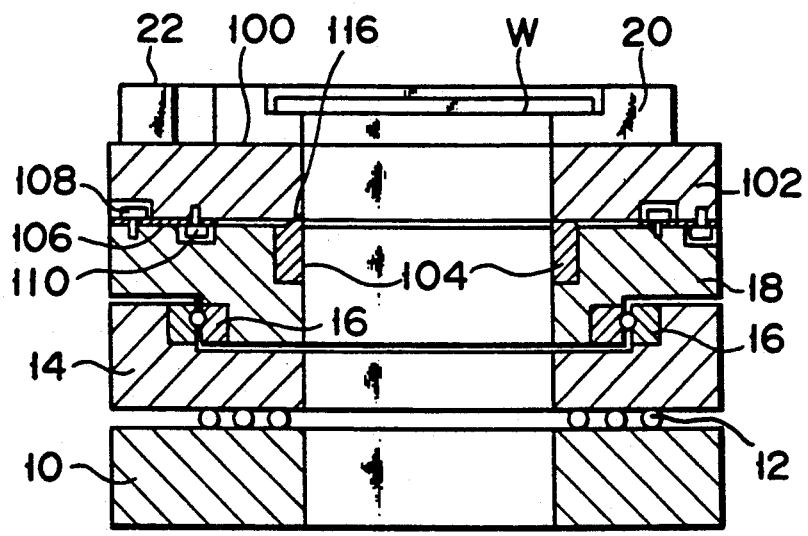
FIG. 31 is a schematic vertical sectional view of the high-accuracy traveling table apparatus of FIG. 30.

FIGS. 30 and 31 show a first modification of the seventh embodiment described above. In this modification, coaxial apertures are bored through the respective central portions of the base 10, the X-table 14, the Y-table 18, mount 102, and the fixing member 20. A plurality of supporting pins 104 are embedded in the peripheral edge portion of each aperture so as to make a ring-shaped pattern.

Figure 32:
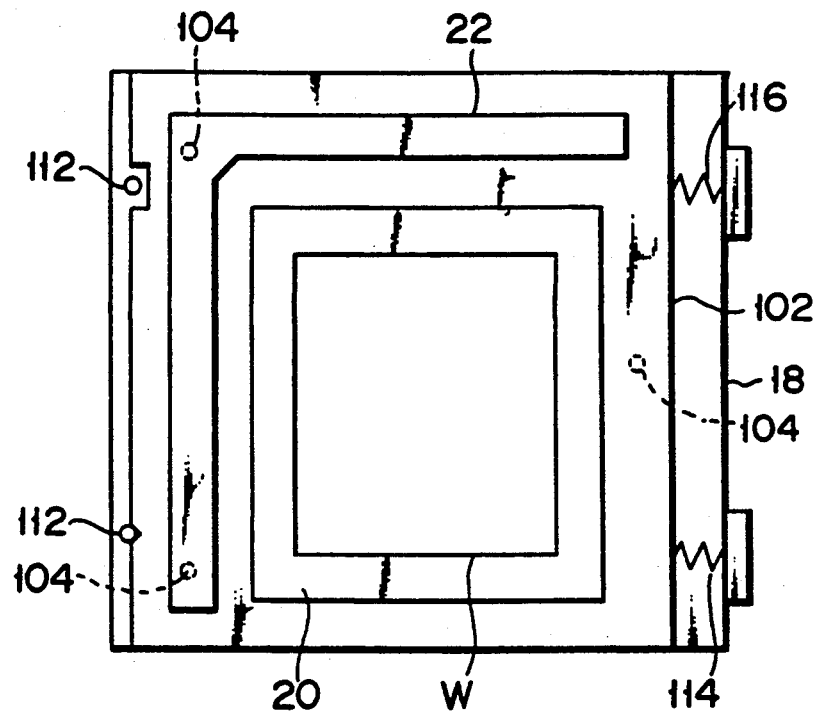
FIG. 32 is a plan view schematically showing a second modification of the high-accuracy traveling table apparatus of FIG. 26.
Figure 33:
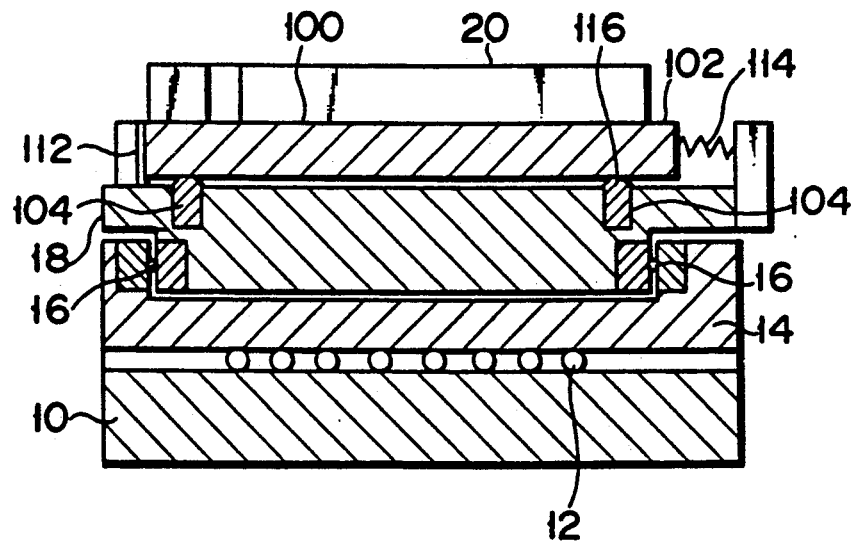
FIG. 33 is a schematic vertical sectional view of the high-accuracy traveling table apparatus of FIG. 32.

FIGS. 32 and 33 show a second modification of the seventh embodiment. In this second modification, mount 102 is pressed against locating pins 112, planted on the Y-table 18, by urging means such as coil springs 114.

In the embodiment and modifications described above, piezoelectric elements 116, as actuators for vertical drive, are contained in some or all of the supporting pins 104, which supports the mount 102 on the Y-table 18. In response to signals from a Z-direction displacement measuring device (not shown), the elements 116 are supplied with electric power, so that the mount 102 is moved up and down, for automatic correction of its position.

What is claimed is:

1. A high-accuracy traveling table apparatus comprising a workpiece fixing means and a laser mirror for position measurement provided on a table capable of traveling at least in the direction of one axis, said table comprising:

a mount to which said workpiece fixing means and said laser mirror are fixed; and at least one partially coupling means for partially coupling said mount to said table so as to prevent transmission of a distortion of said table to said mount, said partially coupling means being interposed between peripheral portions of the surfaces of said mount and said table so as to couple the peripheral portions of the surfaces of said mount and said table to each other, said partially coupling means having at least three elastic coupling members, each of which is coupled with said mount and said table, said elastic coupling member exhibiting elasticity only in the Z axis direction and not in the direction perpendicular to the Z axis.

2. The high-accuracy traveling table apparatus according to claim 1, wherein the apparatus further comprises means for elevating said mount relatively to said table.

3. The high-accuracy traveling table apparatus according to claim 2, wherein a projection is provided with at least one of opposing surfaces of said mount and said table so as to contact the other opposing surface of said mount and said table, and said mount elevating means is a piezoelectric device mounted on either the tip end of said projection or the other opposing surface.

4. The high-accuracy traveling table apparatus according to claim 2, wherein through-holes are coaxially formed on central portions of said mount and said table, respectively, and said mount elevating means is provided on at least one of said mount and said table at periphery of the through-hole.

* * * * *